April 24, 1956  S. STEIN  2,742,779
DIFFERENTIAL PENDULUM VIBROGRAPH
Filed Jan. 23, 1952
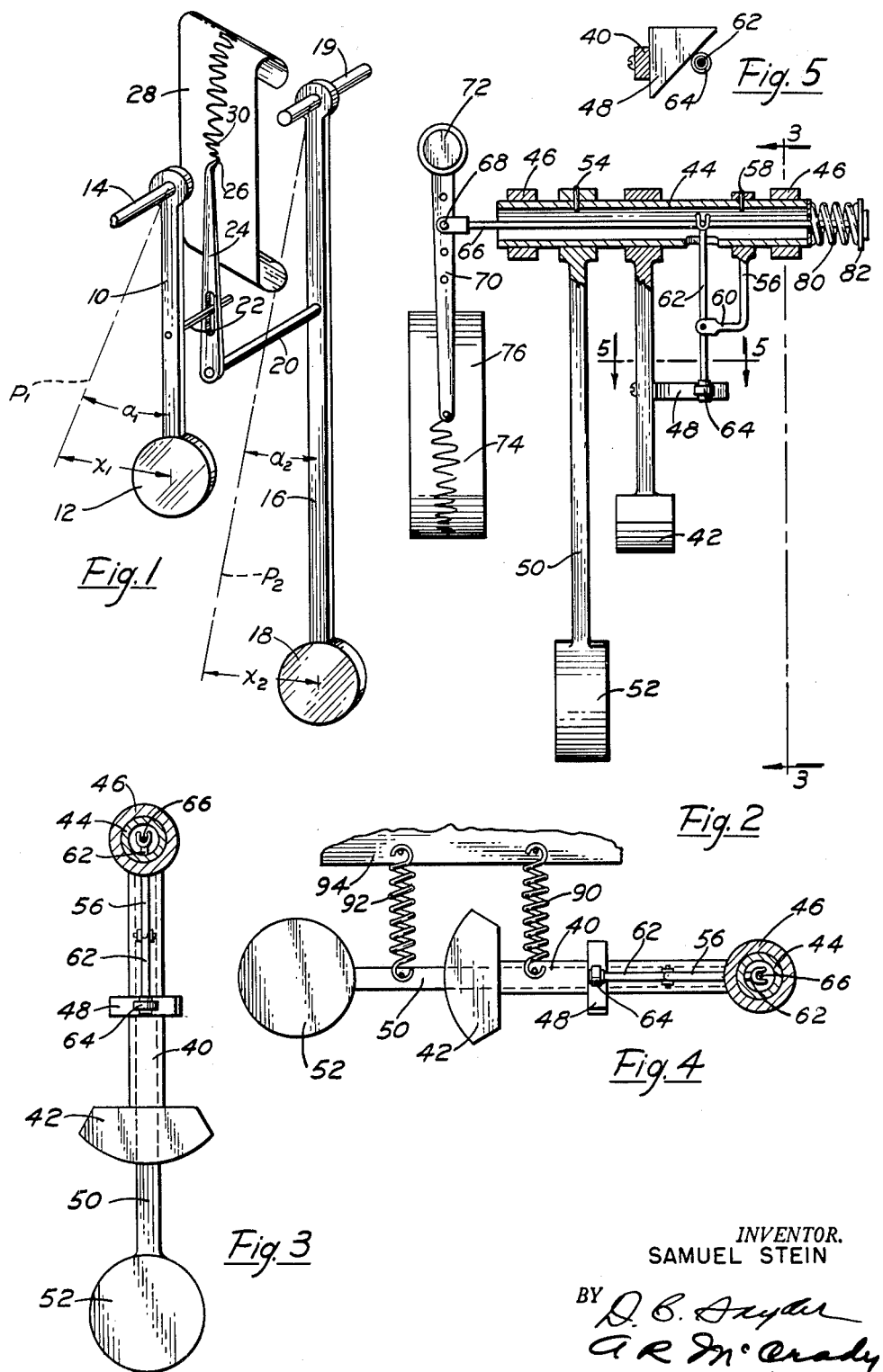
INVENTOR.
SAMUEL STEIN
ATTORNEYS United States Patent Office 2,742,779
Patented Apr. 24, 1956

2,742,779

DIFFERENTIAL PENDULUM VIBROGRAPH

Samuel Stein, Cleveland, Ohio

Application January 23, 1952, Serial No. 267,897

7 Claims. (Cl. 73—71)

(Granted under Title 35, U. S. Code (1952), sec. 266)

The invention described herein may be manufactured and used by or for the Government of the United States of America for governmental purposes without the payment of any royalties thereon or therefor.

This invention relates to a device, commonly called a vibrograph, for indicating and recording vibrations, such as may be caused by an unbalanced propeller shaft or other mechanism, in a vehicle such as marine vessel which is subject to roll or pitch.

In a known type of vibrograph, mechanism including a pendulum is used for response to, and recording of, vibration in the horizontal or vertical plane. This vibration, generally approximating a sine form, is superimposed on a sine wave of lower frequency resulting from the pendulum's response to the roll or pitch of the vessel. The vibration wave is difficult to analyze because its amplitude is small compared to the amplitude of the roll, and while the employment of mechanical linkage can magnify the vibration amplitude, the roll amplitude is likewise magnified by the same factor. The compound curve so produced is difficult to analyze because of the absence of a rectilinear baseline to which the vibrational oscillations may be related.

The mechanism of the present invention comprises two pendulums of different length, oscillatable in parallel planes, with a stylus so connected to the pendulums that it moves relative to the chart when the two pendulum weights are displaced laterally by an equal distance, as will occur when the hull vibrates, but will not so move when the two pendulum rods are displaced by an equal angle, as will occur when the hull rolls.

It is an object of this invention to provide mechanism for recording athwartship vibration without regard to roll; in other words, to record the second curve without compounding it with the first curve. In this way the vibration is recorded as a curve having a rectilinear base line, easily read and analyzed.

By turning the mechanism so that the pendulums oscillate in fore and aft planes, the invention may be used to record fore and aft vibration without recording pitch of the hull. It is therefore a further object of the invention to provide mechanism for recording fore and aft vibration without regard to pitch.

Other objects and many of the attendant advantages of this invention will be readily appreciated as the same becomes better understood by reference to the following description.

Fig. 1 is a diagrammatic view in perspective of a mechanism embodying the invention;

Fig. 2 is a view in side elevation of a modified form of the invention, with parts in section;

Fig. 3 is an end view of the device shown in Fig. 2;

Fig. 4 is an end view of a further modified form; and

Fig. 5 is a fragmentary sectional view, taken on the line 5—5 of Fig. 2.

The apparatus shown in Fig. 1 comprises a shorter pendulum having a rod 10 and a weight 12 and suspended from a spindle 14; also a longer pendulum having a rod 16 and a weight 18 and suspended from spindle 19 in alignment with spindle 14. The second pendulum carries a stud 20 fixed thereto and projecting in the direction of the shorter pendulum. The shorter pendulum carries a stud 22 fixed thereto and projecting in the direction of the longer pendulum. A lever 24 is pivotally related to stud 20, and is provided with a slot which receives stud 22. At its upper end, lever 24 carries a pen or stylus 26 which normally rests in the axis of suspension defined by spindles 14 and 19. A chart or paper 28 is moved past the stylus 26 in order to produce a continuous record in known manner.

Assume that the parts are in the positions shown in Fig. 1, wherein the pendulums are at rest with their rods, and the lever 24, lying in a common vertical plane, and stylus 26 lies in the axis of suspension. If now the vessel rolls, the rods of the pendulums will move in unison to new positions indicated by dotted lines $P_1$ and $P_2$, which also lie in a common vertical plane. Lever 24 will also lie in this plane, and the stylus will remain on the axis of suspension and trace a straight line, since there has been no relative movement between the pendulums; in fact, the ship has moved but the apparatus just described has remained motionless. However, it is convenient to speak instead of movements of the pendulums about their axis of suspension, and so speaking it will be noted that the shorter pendulum has moved through an angle $a_1$ while the longer pendulum has moved through an angle $a_2$ which is equal to $a_1$. The linear displacement $X_1$ of weight 12 is less than the linear displacement $X_2$ of weight 18, due to the pendulums being of different length.

Now assume that the parts are again in the positions shown in full lines, and that the axis of suspension is rapidly displaced to the right, as might occur due to vibration. Weights 12 and 18 will remain substantially stationary due to inertia, the effect being that the pendulum rods assume positions which are approximately indicated by lines $P_1$ and $P_2$, but in this case the linear displacements $X_1$ and $X_2$ are equal, while the angular displacements $a_1$ and $a_2$ are unequal. The rods no longer lie in a common plane, and lever 24 is rotated by stud 22 about stud 20 as a pivot, causing the stylus 26 to move to the left of the axis of suspension and trace a curve on the chart 28. Displacement of the axis of suspension in the opposite direction will have the opposite effect, and the stylus will be caused to trace the oscillations, due to vibration, in the form of a curve 30, which is approximately a sine curve.

In the form of the invention shown in Figs. 2 and 3, the apparatus includes a shorter pendulum having a rod 40 and a weight 42, oscillatably suspended from a tubular beam 44, which is itself rotatable in bearings 46. Near the midpoint of rod 40 is mounted a cam 48 which moves horizontally as the pendulum oscillates. Cam 48 may be simply an inclined plane, as shown, or may be of any desired contour. The longer pendulum comprises a rod 50 and a weight 52, and is fixed to beam 44 as by a key 54, so that oscillation of the pendulum will cause the beam to oscillate.

Forwardly (i. e., to the right in Fig. 2) of pendulum 40—42 is mounted a bracket 56 which is fixed to the beam as by a key 58. The bracket has at its lower end a bifurcated arm 60 to which is pivoted a lever 62. On the lower end of lever 62 is mounted a cam follower in the form of a roller 64, cooperating with cam 48.

The upper end of lever 62 is pivotally connected to a rod 66 which extends through beam 44 at the axis of suspension of the pendulums, being adjustably connected at one end, as by a ball-and-socket coupling 68, to the pointer 70 of a recording device of known type. It will be seen that longitudinal movement of the rod 66 will cause the pointer 70 to oscillate about its axis 72, tracing a curve 74 on a moving chart or tape 76.

The rod 66 is urged to the right (Fig. 2) by a compression spring 80 seated at one end against the beam 44 and at its other end against a washer 82 secured to the end of the rod. As a result, the roller 64 is held at all times in contact with the cam 48.

The operation of the device shown in Figs. 2 and 3 is generally similar to that of the Fig. 1 device. In the positions shown in Figs. 2 and 3, the pendulums are at rest with their rods, and the bracket 56, lying in a common vertical plane, while pointer 70 is in a neutral position at the centerline of the chart. If now the vessel rolls, the pendulums will move in unison to new positions wherein their rods also lie in a common vertical plane. Bracket 56 will also lie in this plane, and there will be no relative movement between cam 48 and its follower 64, hence the pointer 70 will remain in neutral position, tracing a straight line.

Now if the parts are again in the positions shown in Figs. 2 and 3, and the beam 44 is rapidly displaced to the right in Fig. 3 by horizontal vibration, weights 42 and 50 will be displaced, relative to the beam 44, horizontally to the left by equal distances, but the angular displacement of pendulum rod 40 will be greater than that of rod 50 and bracket 56. Due to this differential angular movement of the two pendulums, roller 64 will move relative to cam 48 and lever 62 will be rotated in the counterclockwise direction (Fig. 2), moving rod 66 to the left, compressing spring 80, and rotating pointer 70 in the clockwise direction to cause it to trace a curve indicative of the exciting vibration.

The form of the device shown in Fig. 4 is similar to that shown in Figs. 2 and 3 except that here the pendulums extend horizontally from the beam 44 and are yieldingly supported by tension springs 90 and 92 the upper ends of which are secured to a fixed support 94. It will be apparent that this form of device may be used to record vertical vibrations in the same manner that the device of Figs. 2 and 3 is used to record horizontal vibrations. The stiffness of the springs and their point of attachment to the pendulums should be so chosen that the natural frequency of each pendulum is well below the frequency of the vibration being measured.

It will be apparent that electromagnetic rather than mechanical means may be used to indicate or record the relative movement between the pendulums. It will also be apparent that the present invention is applicable not only to marine vessels but also to aircraft and other vehicles or structures wherein rolling or pitching movements coexist with vibration.

Obviously many modifications and variations of the present invention are possible in the light of the above teachings. It is therefore to be understood that within the scope of the appended claims the invention may be practiced otherwise than as specifically described.

What is claimed is:

1. In a device for indicating vibrations in a rolling or pitching structure, two gravity pendulums of different length with a common axis of suspension, an indicator having a neutral position, and means connecting said indicator to said pendulums and responsive only to relative angular movement of the pendulums to move the indicator from said neutral position.

2. An indicating device for use in a structure subject to slow rotary oscillation about a given axis and subject to vibrations normal to said axis, comprising two pendulums of different length each mounted on an axis parallel to said given axis and each having movement in a plane normal to said axis, said pendulums being suspended in such a manner that their longitudinal axes are normally in alignment in a plane at right angles to the plane of their movement, an indicator having a neutral position, and means interconnecting said pendulums and said indicator and unaffected by said oscillation but responsive to angular movements of the pendulums relative to each other for moving the indicator from its neutral position.

3. The invention defined in claim 2 wherein said interconnecting means includes a cam movable by one pendulum and a coacting cam follower movable by the other pendulum and operatively connected to said indicator.

4. A device for indicating vibrations in a structure subject to oscillatory movements of low periodicity about a horizontal axis, comprising two pendulums of different length suspended on a common axis, an indicator having a neutral position, and means interconnecting said pendulums and responsive only to relative angular movement of the pendulums to move the indicator from said neutral position.

5. The invention defined in claim 4, wherein said means comprises a cam movable by one pendulum and a cooperating cam follower movable by the other pendulum and connected to the indicator.

6. A device for indicating vibrations in a structure subject to movements of low periodicity relative to the vibrations, comprising two pendulums of different length and movable in parallel planes, said pendulums being suspended in such a manner that their longitudinal axes are normally in alignment in a plane at right angles to the plane of their movement, an indicator having a neutral position, and means interconnecting said pendulums and said indicator and unaffected by said movements of low periodicity but responsive to relative angular movement of the pendulums for moving the indicator from said neutral position.

7. The invention defined in claim 6, comprising in addition a stylus carried by said indicator for recording the path thereof.

References Cited in the file of this patent

UNITED STATES PATENTS

| | | |
|---|---|---|
| 898,599 | Pearce | Sept. 15, 1908 |
| 1,280,508 | McHenry | Oct. 1, 1918 |
| 1,285,331 | Nikonow | Nov. 19, 1918 |
| 1,727,310 | Klemperer | Sept. 3, 1929 |

FOREIGN PATENTS

| | | |
|---|---|---|
| 542,883 | Great Britain | Jan. 30, 1942 |